US012807775B2

(12) United States Patent
Desio et al.

(10) Patent No.: US 12,807,775 B2
(45) Date of Patent: Nov. 24, 2026

(54) THERMOPLASTIC COMPOSITES MATERIALS

(71) Applicants: SYENSQO SPECIALTY POLYMERS USA, LLC, Alpharetta, GA (US); Cytec Industries, Inc., Princeton, NJ (US)

(72) Inventors: Glenn P. Desio, Marietta, GA (US); Lewis Williams, Cumming, GA (US)

(73) Assignees: Syensqo Specialty Polymers USA, LLC, Alpharetta, GA (US); Cytec Industies, Inc., Princeton, NJ (US)

( * ) Notice: Subject to any disclaimer, the term of this patent is extended or adjusted under 35 U.S.C. 154(b) by 348 days.

(21) Appl. No.: 18/258,036

(22) PCT Filed: Dec. 16, 2021

(86) PCT No.: PCT/EP2021/086336
§ 371 (c)(1),
(2) Date: Jun. 16, 2023

(87) PCT Pub. No.: WO2022/129432
PCT Pub. Date: Jun. 23, 2022

(65) Prior Publication Data

US 2024/0043638 A1 Feb. 8, 2024

Related U.S. Application Data

(60) Provisional application No. 63/126,668, filed on Dec. 17, 2020.

(30) Foreign Application Priority Data

Apr. 1, 2021 (EP) .................................... 21166772

(51) Int. Cl.

| | |
|---|---|
| ***C08J 5/24*** | (2006.01) |
| ***B32B 5/02*** | (2006.01) |
| ***B32B 5/12*** | (2006.01) |
| ***B32B 27/08*** | (2006.01) |
| ***B32B 27/28*** | (2006.01) |
| ***B32B 27/34*** | (2006.01) |

(52) U.S. Cl.
CPC ............... *C08J 5/249* (2021.05); *B32B 5/024* (2013.01); *B32B 5/12* (2013.01); *B32B 27/08* (2013.01); *B32B 27/285* (2013.01); *B32B 27/34* (2013.01); *C08J 5/243* (2021.05); *C08J 5/244* (2021.05); *B32B 2262/101* (2013.01); *B32B 2262/105* (2013.01); *B32B 2262/106* (2013.01); *B32B 2264/0271* (2013.01); *B32B 2307/516* (2013.01); *B32B 2307/52* (2013.01); *C08J 2423/08* (2013.01)

(58) Field of Classification Search
CPC ............... C08J 2435/00; C08J 2381/04; C08J 2377/06; C08J 2371/00; C08J 2367/03; C08J 2365/00; C08J 2300/12; C08J 5/249; C08J 5/243; C08J 5/244; B32B 2605/08; B32B 2605/18; B32B 2535/00; B32B 2307/516; B32B 2307/52; B32B 2264/0271; B32B 2262/0269; B32B 2262/101; B32B 2262/105; B32B 2262/106; B32B 27/08; B32B 27/18; B32B 27/285; B32B 27/286; B32B 27/288; B32B 27/34; B32B 5/024; B32B 5/12
USPC ....................................................... 428/300.7
See application file for complete search history.

(56) References Cited

U.S. PATENT DOCUMENTS

| | | | | |
|---|---|---|---|---|
| 2008/0274355 A1* | 11/2008 | Hewel | C08J 3/12 | 524/495 |
| 2011/0039470 A1* | 2/2011 | Wakeman | B32B 27/34 | 428/300.7 |
| 2012/0028062 A1 | 2/2012 | Elia | | |
| 2015/0005426 A1* | 1/2015 | Stoppelmann | C08K 5/20 | 524/538 |
| 2016/0101592 A1* | 4/2016 | Sauer | B32B 5/024 | 428/212 |
| 2019/0203004 A1 | 7/2019 | Gerard et al. | | |
| 2019/0225750 A1* | 7/2019 | Lamberts | C08G 69/14 | |

FOREIGN PATENT DOCUMENTS

| | | |
|---|---|---|
| CN | 103387709 A | 11/2013 |
| CN | 108250466 A | 7/2018 |
| EP | 102158 A2 | 3/1984 |
| KR | 20200065701 A | 6/2020 |

OTHER PUBLICATIONS

International Search Report issued for corresponding international patent application No. PCT/EP2021/086336, mailed Mar. 11, 2022 (5 pages).
Written Opinion issued for corresponding international patent application No. PCT/EP2021/086336, mailed Mar. 11, 2022 (7 pages).

* cited by examiner

*Primary Examiner* — Camie S Thompson
(74) *Attorney, Agent, or Firm* — Osha Bergman Watanabe & Burton LLP

(57) ABSTRACT

Multilayer composites laminates comprising continuous fibers and a polymer matrix including a thermoplastic polymer and an impact modifier are disclosed. The invention further relates to articles incorporating the thermoplastic composites laminate.

18 Claims, No Drawings

THERMOPLASTIC COMPOSITES MATERIALS

RELATED APPLICATIONS

This application is a national stage entry under 35 U.S.C. § 371 of International Application No. PCT/EP2021/086336 filed Dec. 16, 2021, which claims priority to U.S. provisional application U.S. 63/126,668 filed on Dec. 17, 2020 and to European patent application EP 21166772.0 filed on Apr. 1, 2021. The entire contents of these applications are explicitly incorporated herein by this reference.

TECHNICAL FIELD

The invention relates to thermoplastic polymer composites laminates comprising a polymer matrix including a thermoplastic polymer and an impact modifier. The invention further relates to articles incorporating the thermoplastic composites laminate.

BACKGROUND ART

Composite materials typically include structural reinforcing fibers embedded in a resin matrix. Composite materials have been employed in a wide variety of applications. For example, continuous fiber composites have been used to form fiber reinforced composite tapes, ribbons, rods, prepregs, laminates, and profiles useful as lightweight structural reinforcements as well as protective casings. Composite materials comprising a thermoplastic polymer matrix are known to offer a number of benefits over thermosetting based materials. For example, thermoplastic prepregs can be more rapidly fabricated into articles. Another advantage is that thermoplastic articles may be recycled.

During the manufacturing of a composite part a composite layup is prepared and the temperature of the composite layup increased to mold the part. The composite layup may be held at an elevated temperature for an extended period of time before it is cooled to ambient temperature.

In many composite material systems, the polymer matrix may have a coefficient of thermal expansion that may be different from the one of the fibers. This difference may result in the polymer and fibers shrinking or expanding by different amounts when the temperature of the composite structure is cooled. The difference in coefficient of linear thermal expansion of the polymer matrix relative to the fibers may result in thermally-induced stresses in the structure. The thermally-induced stresses may result in undesirable small cracks (including transverse cracks, and/or micro-cracks) in the polymer matrix, in particular when the part is extracted from the mould. Microcracking may also occur during the service life of a composite structure due to due to continued cycling of temperature or mechanical load of the operating environment.

It has now been surprisingly found that the presence of an impact modifier in the polymer matrix may significantly reduce, if not eliminate the formation of microcracks in composite materials.

DISCLOSURE OF THE INVENTION

Described herein are composite materials comprising at least two layers, each layer comprising at least one continuous reinforcing fiber and a polymer matrix, said polymer matrix comprising at least one thermoplastic polymer and at least one impact modifier.

The composite materials can be formed using for instance melt impregnation techniques, well known in the art. The composite materials can be desirably used in a wide range of application settings including, but not limited to automotive, aerospace, oil and gas, sporting goods, consumer products, and mobile electronic device applications.

Unless specifically stated otherwise, the term "alkyl", as well as derivative terms such as "alkoxy", "acyl" and "alkylthio", as used herein, include within their scope straight chain and branched chain moieties. The term "alkyl" does not include cyclic moieties. Examples of alkyl groups are methyl, ethyl, 1-methylethyl, propyl, and 1,1 dimethylethyl. Unless specifically stated otherwise, each alkyl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, or $C_6$-$C_{15}$ aryloxy, provided that the substituents are sterically compatible and the rules of chemical bonding and strain energy are satisfied. The term "halogen" or "halo" includes fluorine, chlorine, bromine and iodine, with fluorine being preferred.

The Composite Material

An object of the invention is a composite material comprising at least two layers, hereinafter referred to as "layer (L)", each layer (L) comprising at least one continuous reinforcing fiber and a polymer matrix, said polymer matrix comprising at least one thermoplastic polymer selected from the group consisting of aliphatic polyamides, semi-aromatic polyamides, polyaryleneetherketones, polyphenylenesulfides and liquid crystalline polymers, and at least one impact modifier.

The composite material may comprise more than 2 layers (L). The composite material may comprise 4, 5, 6, 7, 8, 10, 12, 15, 20, 25, 30 and up to 50, 80 layer, even 100 layers (L) or more. Composite material comprising 2 to 80 layers (L) are generally suitable for most applications.

The composite material may consist of layers (L), in the numbers detailed above. Alternatively, the composite material may comprise layers (L) and other layers. The nature of said other layers will depend on the use of the composite material.

In one embodiment the composite material comprises, in addition to the at least two layers (L), one or more than one layers made of a thermoplastic polymer.

In one embodiment the composite material can be a unidirectional composite, also referred to as "tape", that is a composite wherein the reinforcing fibers in each layer (L) are generally aligned along a single direction, typically along the edge of the composite material. Generally aligned fibers typically are oriented such that at least 70%, at least 80%, at least 90% or at least 95% of the reinforcing fibers have a direction that is within 30 degrees, within 25 degrees, within 20 degrees, within 15 degrees, or within 10 degrees along the direction of the other fibers.

In another embodiment the composite material is a multidirectional composite, in which the fibers are arranged at an angle the ones with respect to the others. The reinforcing fibers in the polymer matrix can be arranged as a woven fabric or a layered fabric or any combination of one or more.

Layer (L)

Layer (L) comprises at least one continuous reinforcing fiber impregnated with the polymer matrix as detailed hereafter. As used herein, the expression "continuous reinforcing fiber" refers to a fiber having a length, in the longest dimension, of at least 5 mm.

In some embodiments, the continuous reinforcing fiber has a length, in the longest dimension, of at least 1 cm, at least 25 cm or at least 50 cm. The length of the continuous reinforcing fiber is dependent on the shape and size of the finished part.

The continuous reinforcing fiber is selected from the group consisting of, glass fiber, carbon fibers, aluminum fiber, ceramic fiber, titanium fiber, magnesium fiber, boron carbide fibers, rock wool fiber, steel fiber, aramid fiber and natural fiber (e.g. cotton, linen and wood). Preferably, the continuous reinforcing fiber is selected from the group consisting of glass fiber, carbon fiber, aramid fiber, and ceramic fiber.

In some embodiments, layer (L) may include one or more additional continuous reinforcing fibers, each distinct in compositions and as described above.

Overall, the continuous reinforcing fibers constitute at least 15% of the total volume of layer (L). Typically the continuous reinforcing fibers are at least 20%, at least 25%, even at least 30% of the total volume of layer (L). The continuous reinforcing fibers are no more than 80%, no more than 0.75%, even no more than 70% of the total volume of layer (L). The continuous reinforcing fibers may conveniently represent from 20% to 75%, from 25% to 70%, from 25% to 65% and even from 30% to 60% of the total volume of layer (L). The polymer matrix represents the remainder of the volume of layer (L).

The Polymer Matrix

The polymer matrix comprises at least one thermoplastic polymer selected from the group consisting of aliphatic polyamides, semi-aromatic polyamides, polyaryleneetherketones, polyphenylene sulfides and liquid crystal polymers, and at least one impact modifier.

In an embodiment of the invention, the polymer matrix comprises at least one thermoplastic polymer selected from the group consisting of aliphatic polyamides, semi-aromatic polyamides, polyaryleneetherketones, and liquid crystal polymers, and at least one impact modifier. In another embodiment, the polymer matrix comprises at least one thermoplastic polymer selected from the group consisting of semi-aromatic polyamides and polyaryleneetherketones, and at least one impact modifier.

Without being bound by theory it has been found that the presence of the impact modifier in the polymer matrix allows significantly reducing the formation of microcracks in composite materials comprising more than one layer.

The Aliphatic Polyamide

The thermoplastic polymer in the polymer matrix can be selected among the aliphatic polyamides, that is polyamides having a recurring unit ($R_{APA}$) represented by the following formula:

(1)

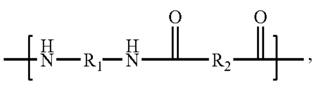

where $R_1$ is a linear or branched $C_4$ to $C_{40}$ alkyl and $R_2$ is a linear or branched $C_2$ to $C_{38}$ alkyl.

Recurring unit ($R_{APA}$) is formed from the polycondensation of an aliphatic diamine and an aliphatic dicarboxylic acid. The aliphatic diamine may be selected from the group consisting of 1,3 diaminobutane, 1,4-diaminobutane, 1,5-diaminopentane, 2-methyl-1,5-diaminopentane, 1,6-diaminohexane, 3-methylhexamethylenediamine, 2,5 dimethylhexamethylenediamine, 2,2,4-trimethylhexamethylenediamine, 2,4,4-trimethylhexamethylenediamine, 1,7-diaminoheptane, 1,8-diaminooctane, 2,2,7,7 tetramethyloctamethylenediamine, 1,9-diaminononane, 2-methyl-1,8-diaminooctane, 5-methyl-1,9-diaminononane, 1,10-diaminodecane, 1,11-diaminoundecane, 1,12-diaminododecane, 1,13-diaminotridecane and 1,18-diaminooctadecane.

Included in this category are also cycloaliphatic diamines such as isophorone diamine, 1,3-diaminocyclohexane, 1,4-diaminocyclohexane, bis-p-aminocyclohexylmethane, 1,3-bis(aminomethyl)cyclohexane, 1,4-bis(aminomethyl)cyclohexane, bis(4-amino-3-methylcyclohexyl) methane and bis (4-aminocyclohexyl) methane.

The aliphatic dicarboxylic acid may be selected from the group consisting of succinic acid, glutaric acid, 2,2 dimethyl glutaric acid, adipic acid, 2,4,4 trimethyl-adipic acid, pimelic acid, suberic acid, azelaic acid, sebacic acid, undecanedioic acid, dodecandioic acid, tridecanedioic acid, tetradecanedioic acid, pentadecanedioic acid, hexadecanedioic acid and octadecanedioic acid.

In some embodiments, recurring unit ($R_{APA}$) is formed from the polycondensation of a diamine $H_2N—(CH_2)_n—NH_2$ and dicarboxylic acid $HO—C(=O)—(CH_2)_m—C(=O)—OH$ where n is an integer from 4 to 40 and m is an integer from 2 to 38. The person of ordinary skill in the art will recognize that each combination of n and m, within the explicitly defined ranges above, is individually contemplated and within scope of the present disclosure. Preferably, n is from 4 to 40. Preferably, m is from 4 to 38. In one embodiment n is 38. In one embodiment, m is 36. Non-limiting examples of combinations of n and m include, but are not limited to the following (n,m): (4,4), (4,8), (4,16), (4,34), (5,4), (5,10), (5,16), (5,34), (6,4), (6,8), (6,10), (6,16), (10,8), (10,10) and (12,10).

In some embodiments, the aliphatic polyamide is selected from the group consisting of PA 4,6; PA 4,10; PA 4,18; PA 4,36; PA 5,6; PA 5,12; PA 5,18; PA 5,36; PA 6,6; PA 6,10; PA 6,12; PA 6,18; PA 10,10; PA 10,12 and PA12,12.

In some embodiments, the aliphatic polyamide includes at least 50 mol %, at least 55 mol %, at least 60 mol %, at least 70 mol %, at least 80 mol %, at least 90 mol %, at least 95 mol %, at least 99.9 mol % or at least 99.99 mol % of recurring unit ($R_{APA}$). As used herein, mol % is relative to the total number of recurring units in the indicated polymer (e.g. polyamide), unless explicitly noted otherwise.

The aliphatic polyamide can be crystalline or amorphous. As used herein, a crystalline polymer has a heat of fusion ("$\Delta$ Hf") of at least 5 Joules per gram ("J/g"), preferably more than 10 J/g. Also, as used herein, an amorphous polymer has a $\Delta$ Hf of less than 5 J/g, preferably less than 3 J/g. $\Delta$ Hf can be measured according to ASTM D3418 using a heating and cooling rate of 20 °C/min. Preferably, the aliphatic polyamide is crystalline.

In some embodiments, the concentration of the aliphatic polyamide in the polymer matrix is at least 50 wt. %, at least 60 wt. %, at least 70 wt. % at least 80 wt. %, at least 90 wt. %, at least 95 wt. % or at least 99.5 wt. %, relative to the total weight of the matrix composition. In some embodiments, the matrix composition can include additional polymers. In some embodiments, the matrix composition can include one or more additional aliphatic polyamides. In embodiments, in which the matrix composition includes one or more additional aliphatic polyamides, (i) the total concentration, in the matrix composition, of the aliphatic polyamide and one or more additional aliphatic polyamides is within the range given above with respect to the aliphatic polyamide or (i) the concentrations, in the matrix composition, of each of the aliphatic polyamide and one or more additional aliphatic polyamides is independently within the range given above with respect to the aliphatic polyamide.

The Semi-Aromatic Polyamide

The thermoplastic polymer in the polymer matrix may be selected from the semi-aromatic polyamides. The expression "semi-aromatic polyamide" is used herein to refer to any polyamide polymer having at least 50 mole percent ("mol %") of a recurring unit $R_{PAA}$ having at least one amide group (—CONH—) and at least one arylene group, and at least one alkylene group. Arylene groups of interest include, but are not limited to, phenylene, naphthalene, p-biphenylene and metaxylylene. In some embodiments, the semi-aromatic polyamide includes at least 60 mol %, at least 70 mol %, at least 80 mol %, at least 90 mol %, at least 95 mol %, at least 99 mol %, or at least 99.9 mol % of recurring unit $R_{PAA}$. As used herein, mol % is relative to the total number of moles of recurring units in the polymer, unless explicitly noted otherwise. Preferably, the semi-aromatic polyamide polymer is a crystalline polyamide polymer.

In some embodiments, recurring unit $R_{PAA}$ is represented by a formula selected from the following group of formulae:

(2)

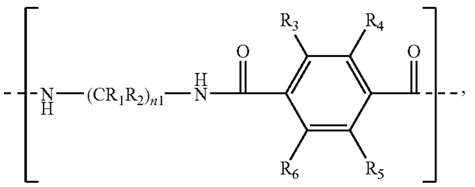

(3)

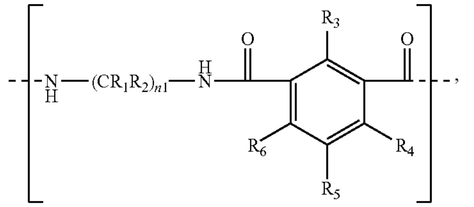

(4)

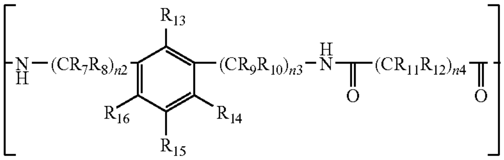

and (5)

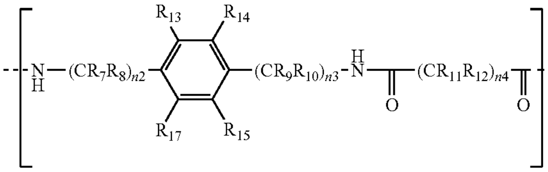

where $R_1$, $R_2$, and $R_7$ to $R_{12}$, at each location, and $R_3$ to $R_6$ and $R_{13}$ to $R_{16}$ are independently selected from the group consisting of a hydrogen, a halogen, an alkyl, a cycloalkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; $n_1$ and $n_2$ are independently selected integers from 4 to 10; and $n_2$ and $n_3$ are independently selected integers from 1 to 5. As used herein, a dashed bond ("- - -") indicates a bond to an atom outside the drawn structure, for example, to an atom in an adjacent recurring unit. Furthermore, the person of ordinary skill in the art will recognize that in the representation $—(CR_aR_b)_n—$, there are n carbon atoms bonded in a linear chain, with each carbon having an independently selected $R_a$ and $R_b$ group bound to it. In some embodiments, $R_1$, $R_2$, and $R_7$ to $R_{12}$, at each location, and $R_3$ to $R_6$ and $R_{13}$ to $R_{16}$ are all hydrogen. Additionally or alternatively, in some embodiments, $n_1$ and $n_4$ are 6, $n_2$ and $n_3$ are 1, or both. Examples of desirably semi-aromatic polyamides according to Formulae (2) to (5) include, but are not limited to PA 4T, PA 5T, PA 6T, PA 6I, PA 9T, PA 10T and MXD6 as well as their copolymers.

The semi-aromatic polyamide can have additionally recurring units distinct from $R_{PAA}$. For example, in some embodiments, the semi-aromatic polyamide polymer can have one or more additional recurring units, $R^*_{PAA}$, each distinct from $R_{PAA}$ and represented by a formula selected from formulae (2) to (5). Additionally or alternatively, in some embodiments, the semi-aromatic polyamide polymer can include one or more aliphatic recurring units, $R^{**}_{PAA}$, according to the following formula:

(6)

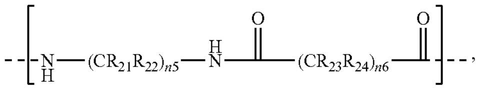

where $R_{21}$ to $R_{24}$, at each location, is independently selected from the group consisting of a hydrogen, a halogen, an alkyl, a cycloalkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; $n_5$ is an integer from 4 to 10 and ne is an integer from 2 to 8. In some embodiments, $R_{21}$ to $R_{24}$, at each location is a hydrogen. Additionally or alternatively, in some embodiments, $n_5$ is 6 and $n_6$ is 4. Examples of desirably semi-aromatic polyamides including additionally recurring units include, but are not limited to, PA 6T/6I, PA 6T/66 and PA 6T/6I/66. In some embodiments, when the polyamide polymer includes further recurring units, the total number of recurring units $R_{PAA}$, $R^*_{PA}$ and $R^{**}_{PA}$ is within the ranges described above with respect to $R_{PAA}$. In some other embodiments, the total number of recurring unit $R_{PAA}$, is within the ranges described above.

The Polyaryletherketones

The thermoplastic polymer in the polymer matrix can be selected among polyaryletherketone polymers (hereinafter "PAEK"), that is those polymers including at least 50 mol % of a recurring unit $R_{PAEK}$. In some embodiments, the PAEK polymer includes at least 60 mol %, at least 70 mol %, at least 80 mol %, at least 90 mol %, at least 95 mol %, at least 99 mol % or at least 99.9 mol % of the recurring unit $R_{PAEK}$.

Recurring unit $R_{PAEK}$ is represented by a formula selected from the following group of formulae:
(J-A)
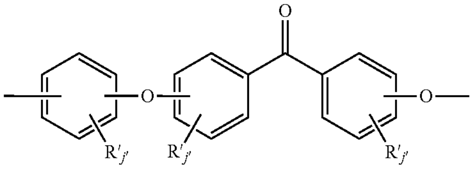
(J-B)
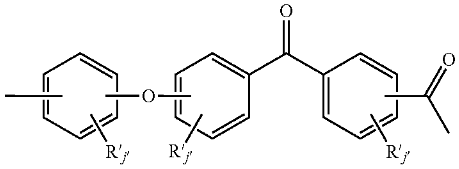
(J-C)
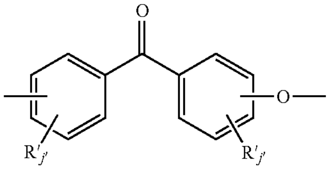
(J-D)
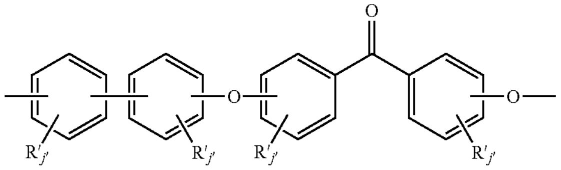
(J-E)
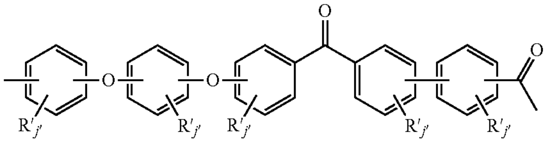
(J-F)
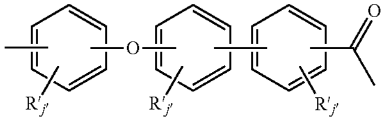
(J-G)
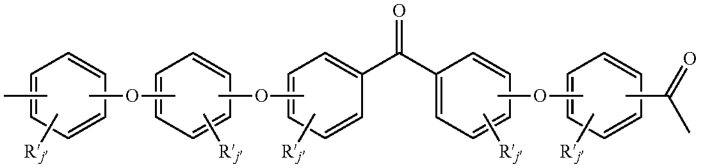
(J-H)
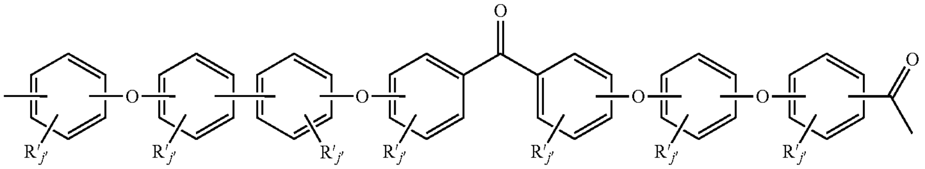
(J-I)
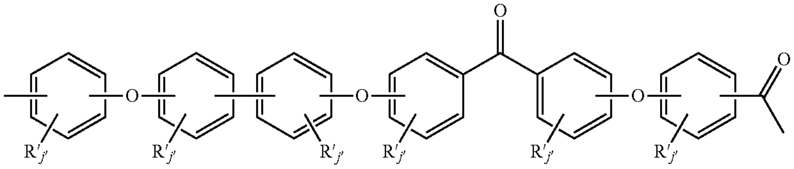
(J-J)
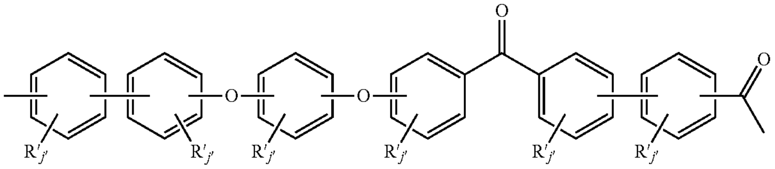
(J-K)
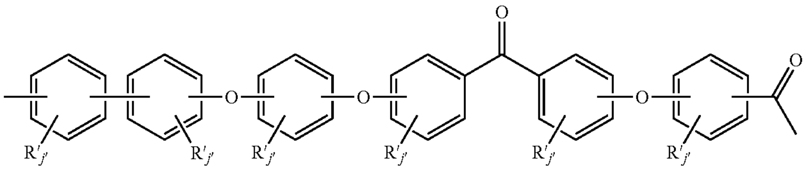

-continued (J-L)

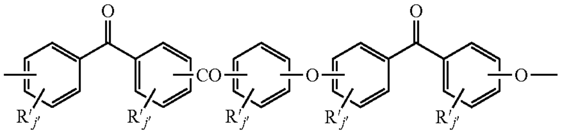

(J-M)

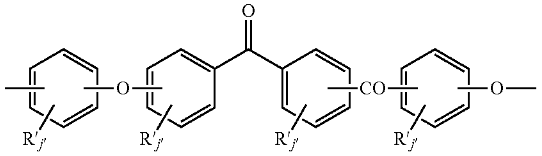

(J-N)

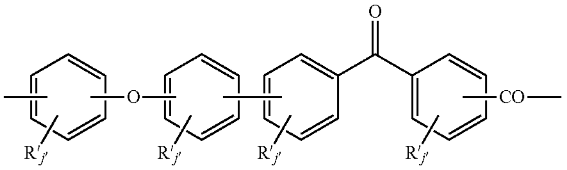

(J-O)

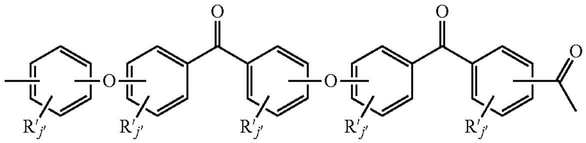

(J-P)

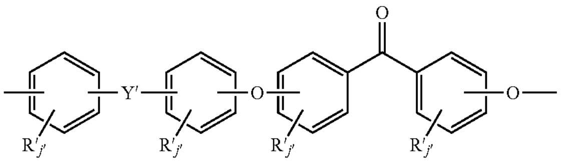

(J-Q)

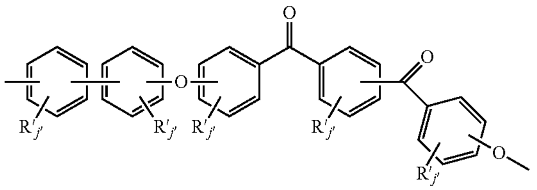

where R', at each location, is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; j' is an integer from 0 to 4; and Y' is an alkylidene group. For clarity, the number of hydrogens on each $R'_{j'}$ substituted ring is 4-j.

In recurring unit $R_{PAEK}$, the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkages. Still, in recurring unit $R_{PAEK}$, j' is preferably at each occurrence zero, that is to say that the phenylene moieties have no other substituents than those enabling linkages in the main chain of the polymer. Preferred recurring unit $R_{PAEK}$ are thus selected from those of formulae (J'-A)-(J'-Q) here below:

(J'-A)

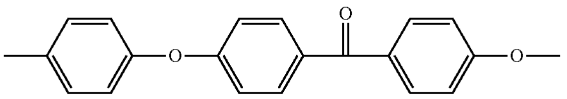

(J'-B)

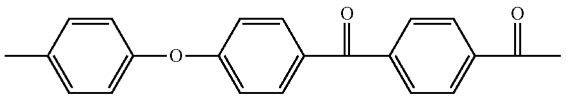

(J'-C)

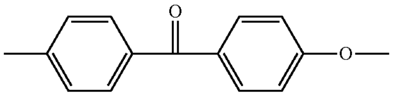

(J'-D)

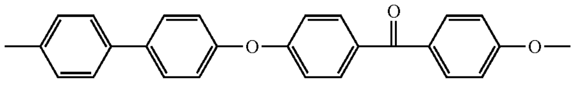

(J'-E)

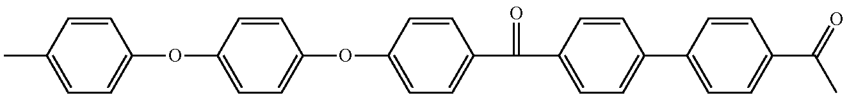

(J'-F)

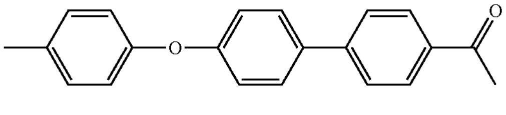

(J'-G)

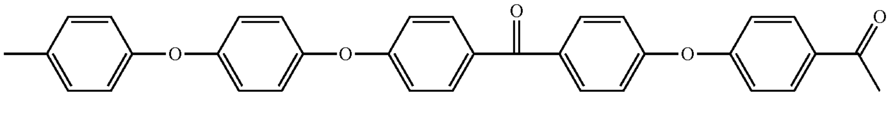

-continued (J'-H)

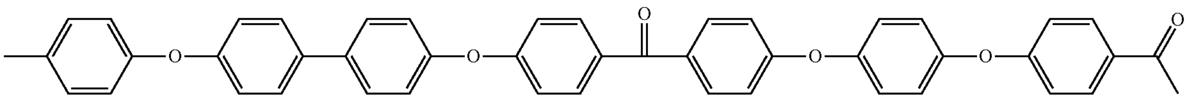

(J'-I)

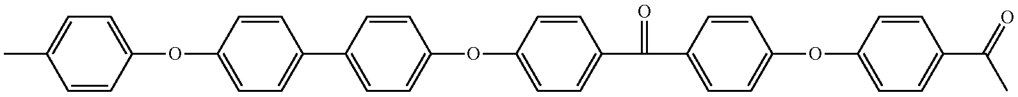

(J'-J)

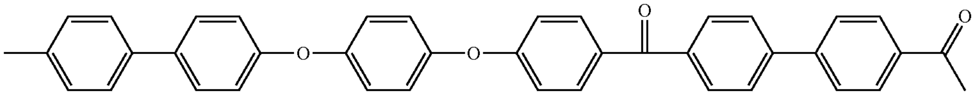

(J'-K)

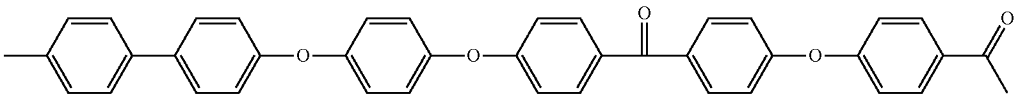

(J'-L)

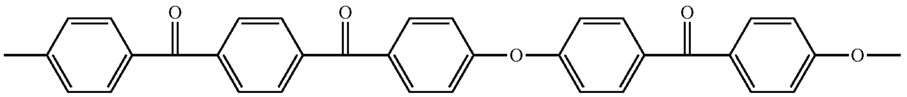

(J'-M)

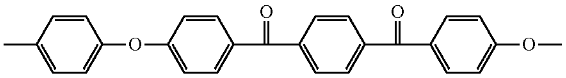

(J'-N)

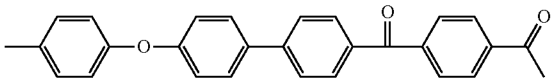

(J'-O)

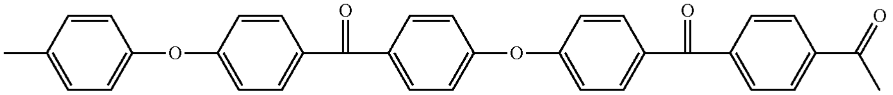

(J'-P)

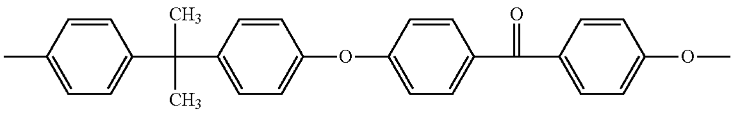

(J'-Q)

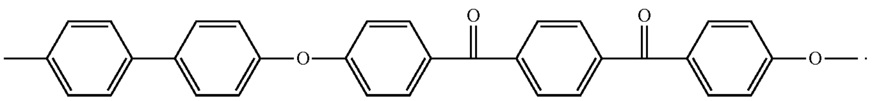

In some embodiments, recurring unit $R_{PAEK}$ is represented by a formula selected from the group of formulae consisting of (J-A), (J-B), (J-C) and (J-O). In some such embodiments, recurring unit $R_{PAEK}$ is represented by a formula selected from the group of formulae consisting of (J'-A), (J'-B), (J'-C) and (J'-O).

In a preferred embodiment, the PAEK polymer is a poly(ether ether ketone) ("PEEK") polymer (recurring unit $R_{PAEK}$ is represented by Formula (J-A), preferably Formula (J'-A)). Examples of commercially available suitable PAEK polymers include, but are not limited to, KetaSpire® PEEK from Solvay Specialty Polymers, Vestakeep® PEEK from Evonik, Victrex® PEEK, PEEK-HT and PEEK-ST from Victrex®, Cypek® FC and Cypek® HT PEKK from Cytec.

In some embodiments, the PAEK polymer has a melt viscosity of at least 0.05 kN-s/$m^2$, more preferably of at least 0.07 kN-s/$m^2$, more preferably of at least 0.08 kN-s/$m^2$. Additionally or alternatively, in some embodiments, the PAEK polymer has a melt viscosity of at most 0.65 kN-s/$m^2$, more preferably of at most 0.60 kN-s/$m^2$, more preferably of at most 0.50 kN-s/$m^2$. In some embodiments, the PAEK polymer has a melt viscosity of from 0.05 kN-s/$m^2$ to 0.65 kN-s/$m^2$, from 0.07 kN-s/$m^2$ to 0.60 kN-s/$m^2$, or from 0.08 kN-s/$m^2$ to 0.50 kN-s/$m^2$. Melt viscosity can be measured according to ASTM D3835 at 400 °C and 1000 $s^{-1}$ using a tungsten carbide die of 0.5×3.175 mm.

In some embodiments, the PAEK polymer has an inherent viscosity of at least 0.4 dL/g, more preferably of at least 0.5 dL/g, most preferably of at least 0.6 dL/g. Additionally or alternatively, in some embodiments, the PAEK polymer has an inherent viscosity of at most 2.0 dL/g, more preferably of at most 1.7 dLg/, most preferably of at most 1.5 dL/g. In some embodiments, the PAEK polymer has an inherent viscosity of from 0.4 dL/g to 2.0 dL/g, from 0.5 dL/g to 1.7 dL/g, or from 0.6 dL/g to 1.5 dL/g. Inherent viscosity can be measured according to ASTM D2857-95, at 0.1 vol % in concentrated sulfuric acid at 25 °C.

The Polyphenylene Sulfide Polymer

The thermoplastic polymer in the polymer matrix can be selected among polyphenylene sulfide polymers (PPS), that is a polymer having at least 50 mol % of a recurring unit $R_{PPS}$ relative to the total number of recurring units. In some embodiments, the PPS polymer includes at least 60 mol %, at least 70 mol %, at least 80 mol %, at least 90 mol %, at least 95 mol %, at least 99 mol %, or at least 99.9 mol % of recurring unit $R_{PPS}$.

Recurring unit $R_{PPS}$ is represented by the following formula:

(7)

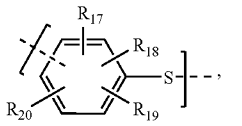

where $R^{17}$ to $R^{20}$ are independently selected from the group consisting of a hydrogen, an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine. Preferably $R^{17}$ to $R^{20}$ are all hydrogen. In some embodiments, recurring unit $R_{PPS}$ is represented by the following formula:

(8)

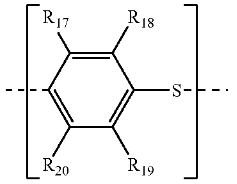

In some such embodiments, $R^{17}$ to $R^{18}$ are all hydrogen.

In some embodiments, the PPS polymer has a melt flow rate of 10 g/10 min to 1000 g/10 min, from 20 g/10 min to 500 g/10 min, or from 30 g/10 min to 200 g/10 min. Melt flow rate can be measured according to ASTM D1238, Procedure B, at 316 °C and 5 kg.

The Liquid Crystal Polyesters

The thermoplastic polymer in the polymer matrix can be selected among the liquid crystal polyesters. For the purpose of the invention, the expressions "liquid crystal polyester" and "LCP" are intended to denote any polymer, comprising recurring units, more than 80% moles of said recurring units are recurring units ($R_{LCP}$) which are obtained through the polycondensation of at least one aromatic dicarboxylic acid monomer and at least one aromatic diol monomer.

Preferably, the LCP contains recurring units ($R_{LCP}$) which are obtained through the polycondensation of at least one hydroxycarboxylic acid monomer, at least one aromatic dicarboxylic acid monomer compound and at least one aromatic diol monomer.

The LCP of the polymer composition (C) may contain recurring units ($R_{LCP}$) which are obtained through the polycondensation of one or more of the following aromatic dicarboxylic acid monomer units: terephthalic acid, isophthalic acid, 2,6-naphthalic dicarboxylic acid, 3,6-naphthalic dicarboxylic acid, 1,5-naphthalic dicarboxylic acid, 2,5-naphthalic dicarboxylic acid, 2,7-naphthalic dicarboxylic acid, 1,4-naphthalic dicarboxylic acid, 4,4'-dicarboxybiphenyl, and alkyl, aryl, alkoxy, aryloxy or halogen substituted derivatives thereof.

In addition to recurring units ($R_{LCP}$) which are obtained through the polycondensation of aromatic dicarboxylic acid monomer compounds, the LCP may also contain recurring units ($R_{LCP}$) which are obtained through the polycondensation of one or more of the following diol monomer units: 4,4'-biphenol, hydroquinone, resorcinol, 3,3'-biphenol, 2,4'-biphenol, 2,3'-biphenol, and 3,4'-biphenol, 2,6 dihydroxynaphthalene, 2,7-dihydroxynaphthalene, 1,6 dihydroxynaphthalene, 1,4-dihydroxynaphthalene, and alkyl, aryl, alkoxy, aryloxy or halogen substituted derivatives thereof.

Optionally, the LCP may contain recurring units ($R_{LCP}$) which are obtained through the polycondensation of one or more of the following aromatic hydroxycarboxylic acid monomer units: p-hydroxybenzoic acid, 5-hydroxyisophthalic acid, m-hydroxybenzoic acid, o-hydroxybenzoic acid, 4' hydroxyphenyl-4-benzoic acid, 3'-hydroxyphenyl-4-benzoic acid, 4' hydroxyphenyl-3-benzoic acid, 2,6-hydroxynaphthalic acid, 3,6-hydroxynaphthalic acid, 3,2-hydroxynaphthalic acid, 1,6-hydroxynaphthalic acid, and 2,5-hydroxynaphthalic acid, and alkyl, aryl, alkoxy, aryloxy or halogen substituted derivatives thereof.

In a preferable embodiment of the invention LCP comprises recurring units ($R_{LCP}$) which comprise at least one of the following structural units:

structural units (1) derived from hydroquinone, (I)

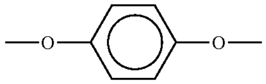

structural units (II) derived from 4,4'-biphenol, (II)

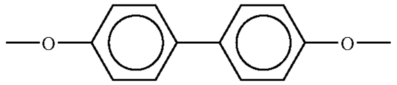

structural units (III) derived from terephthalic acid, (III)

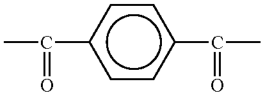

structural units (IV) derived from p-hydroxybenzoic acid, (IV)

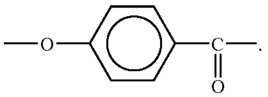

and, optionally in addition, structural units (V) derived from isophthalic acid;

(V)

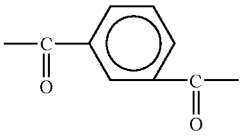

In other embodiments, the recurring units ($R_{LCP}$) contain only one of the structural units (I), (II), (III) and (IV), preferably at least two of the structural units (I)-(IV), more preferably at least three of the structural units (I)-(IV), even more preferably at least four of the structural units (I)-(IV). In still other embodiments of the invention the recurring units ($R_{LCP}$) contain only two of the structural units (I)-(IV), more preferably only three of the structural units (I)-(IV), even more preferably only four of the structural units (I)-(IV).

The recurring units ($R_{LCP}$) may also comprise polycondensed monomer units corresponding to structural units (I), (II), (III), (IV) and (V) in the following amounts: 5-40 mol % of a mixture of hydroquinone (I) and 4,4'-biphenol (II); 5-40 mol % of a mixture that comprises terephthalic acid (III) and isophthalic acid (V); and 40-90 mol % of p-hydroxybenzoic acid (IV). Mol % is based on the total number of moles of polycondensed monomer units corresponding to structural units (I)-(V) present in the LCP.

Preferably the recurring units ($R_{LCP}$) comprise polycondensed monomer units corresponding to structural units (I), (II), (III), (IV) and (V) in the following amounts: 10-30 mol % of a mixture of hydroquinone (I) and 4,4'-biphenol (II); 10-30 mol % of a mixture that comprises terephthalic acid (III) and isophthalic acid (V); and 40-80 mol % of p-hydroxybenzoic acid (IV). Mol % is based on the total number of moles of polycondensed monomer units corresponding to structural units (I)-(V) present in the LCP.

In the LCP the mole ratio of the number of moles of recurring units ($R_{LCP}$) derived from isophthalic acid to the number of moles of monomer units derived from terephthalic acid may be from 0 to less than or equal 0.1.

In the LCP the ratio of the number of moles of monomer units derived from hydroquinone to the number of moles of monomer units derived from 4,4'-biphenol may be from 0.1 to 1.50. Preferably the molar ratio of the number of moles of monomer units derived from hydroquinone to the number of moles of monomer units derived from 4,4'-biphenol is from 0.2 to 1.25, 0.4 to 1.00, 0.6 to 0.8, or 0.5 to 0.7.

The molar ratio of structural units derived from monomers hydroquinone and 4,4'-biphenol to units derived from terephthalic and isophthalic acid is preferably from 0.95 to 1.05.

The mole ratio of oxybenzoyl units to the sum of terephthalic and isophthalic units may be within the range of from about 1.33:1 to about 8:1, i.e., compositions containing 60 to 85 mol % of p-hydroxybenzoic acid with respect to sum of p-hydroxybenzoic acid and total diols and further defined by isophthalic acid content of 0 to 0.09 mol % with respect to sum of the mols of isophthalic and terephthalic acid.

The LCP optionally includes one or more other polycondensed monomer units derived from one or more compounds other than p-hydroxybenzoic acid, terephthalic acid, isophthalic acid, hydroquinone and 4,4'-biphenol.

In a preferable embodiment, the LCP include polycondensed monomer units that contain one or more naphthyl groups. For example, they may include one or more of 3-hydroxy-2-naphthoic acid, 6-hydroxy-2-naphthoic acid, 2-hydroxynaphthalene-3,6-dicarboxylic acid, 2,6-naphthalic dicarboxylic acid, 3,6-naphthalic dicarboxylic acid, 1,5-naphthalic dicarboxylic acid, 2,5-naphthalic dicarboxylic acid, 2,7-naphthalic dicarboxylic acid, 1,4-naphthalic dicarboxylic 2,6-dihydroxynaphthalene, 2,7-dihydroxynaphthalene, acid, 1,6-dihydroxynaphthalene, 1,4-dihydroxynaphthalene, and alkyl, aryl, alkoxy, aryloxy or halogen substituted derivatives thereof.

Preferably, the LCP contains only recurring units ($R_{LCP}$) made from p-hydroxybenzoic acid, terephthalic acid, isophthalic acid, hydroquinone and 4,4'-biphenol, or only monomer units derived from p-hydroxybenzoic acid, terephthalic acid, hydroquinone and 4,4'-biphenol. Within the context of the invention, LCP includes polycondensed recurring units ($R_{LCP}$) made from a mixture of p-hydroxybenzoic acid, terephthalic acid, isophthalic acid, hydroquinone and 4,4'-biphenol, that further includes other aromatic and non-aromatic monomer compounds present as unavoidable or adventitious impurities in the aromatic monomer compounds.

In preferred embodiments the LCP comprises polycondensed monomer units (i.e., polymerized structural units) in the following amounts: 50-70 mol % of p-hydroxybenzoic acid; 15 to 25 mol % of a mixture that comprises terephthalic acid and isophthalic acid; and 15-25 mol % of a mixture of hydroquinone and 4,4'-biphenol. All values and subranges between the stated values are expressly included herein as if written out, for example, p-hydroxybenzoic acid may be present in a range of 45-75, 55-65, and about 60 mol %, the mixture of terephthalic and isophthalic acid may be present in amounts of 12.5-27.5, 22.5-27.5, and about 20 mol %; and the mixture of hydroquinone and 4,4'-biphenol may be present in amounts of 12.5-27.5, 27.5-22.5, and about 20 mol %. All numbers between the stated values are expressly included herein as if written out, e.g., values between an exemplary range of 22.5 to 27.5 mol % include 23, 24, 25, 26, and 27 mol %. Mol % is based on the total number of moles of polymerized monomer units corresponding to structural units (I)-(V) present in the LCP.

In further preferred embodiments the LCP includes polycondensed structural units in the following amounts: 55-65 mol % of p-hydroxybenzoic acid; 16 to 23 mol % of terephthalic acid; 0 to 2 mol % of isophthalic acid; 1.5 to 14 mol % of hydroquinone; and 7 to 21 mol % of 4,4'-biphenol. More preferable still are embodiments in which the polymerized structural units are present in the following amounts: 58-62 mol % of p-hydroxybenzoic acid; 18 to 21 mol % of terephthalic acid; 0.1 to 1.0 mol % of isophthalic acid; 3.2 to 12.6 mol % of hydroquinone; and 7.5 to 17.5 mol % of 4,4'-biphenol. Preferably the amount of isophthalic acid is 2 mol % or less.

In a preferred embodiment the LCP includes at least 95 mol %, preferably 96, 97, 98 or 99 mol % of structural units derived from p-hydroxybenzoic acid, terephthalic acid, isophthalic acid, hydroquinone and 4,4'-biphenol. In an especially preferred embodiment the wholly LCP includes only structural units derived from p-hydroxybenzoic acid, terephthalic acid, isophthalic acid, hydroquinone and 4,4'-biphenol.

In other embodiments the LCP includes at least 50 mol %, preferably 60, 70, 80, or 90 mol % of structural units derived from p-hydroxybenzoic acid, terephthalic acid, isophthalic acid, hydroquinone and 4,4'-biphenol, with the balance of structural units representing other aromatic monomer compounds.

The melting point of the LCP of the invention are preferably less than 400 °C and greater than 300 °C, more preferably less than 390 °C and greater than 325 °C, especially preferably about 375 °C.

As example of commercially available LCP, one can notably mention XYDAR® LCP from Solvay Specialty Polymers USA, LLC.

The Impact Modifier

The composition includes at least one impact modifier. In some embodiments, a rubbery low-modulus functionalized polyolefin impact modifier with a glass transition temperature ("Tg") lower than 25 °C is desirable.

The polymer backbone of the impact modifier can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core shell elastomers of methacrylate-butadiene-styrene (MBS) type, or mixture of one or more of the above.

When the impact modifier is functionalized, the functionalization of the backbone can result from the copolymerization of monomers which include the functionalization or from the grafting of the polymer backbone with a further component.

Specific examples of functionalized impact modifiers are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride.

Functionalized polyolefin impact modifiers are available from commercial sources, including maleated polypropylenes and ethylene-propylene copolymers available as Exxelor® PO and maleic anhydride-functionalized ethylene-propylene copolymer rubber comprising about 0.6 weight percent pendant succinic anhydride groups, such as Exxelor® VA 1801 from the Exxon Mobil Chemical Company; acrylate-modified polyethylenes available as Surlyn®, such as Surlyn® 9920, acrylic or methacrylic acid-modified polyethylene from Dow Inc.; maleic anhydride-modified SEBS block copolymer, such as Kraton® FG1901X, a SEBS that has been grafted with about 2 wt. % maleic anhydride, available from Kraton Polymers; maleic anhydride-functionalized EPDM terpolymer rubber, such as Royaltuf® 498, a 1% maleic anhydride functionalized EPDM, available from the SI Group. Suitable functional groups on the impact modifier include chemical moieties that can react with end groups of the semi-crystalline polyamide and/or amorphous polyamide to provide enhanced adhesion to the matrix polymer(s).

Other desirable functionalized impact modifiers include, but are not limited to, ethylene-higher alpha-olefin polymers and ethylene-higher alpha-olefin-diene polymers grafted or copolymerized with reactive carboxylic acids or their derivatives such as, for example, acrylic acid, methacrylic acid, maleic anhydride or their esters. Suitable higher alpha-olefins include, but are not limited to, C3 to C8 alpha-olefins such as, for example, propylene, 1-butene, 1-hexene and styrene. Alternatively, copolymers having structures comprising such units may also be obtained by hydrogenation of suitable homopolymers and copolymers of polymerized 1-3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers.

Among reactive impact modifiers mention may be made of a random terpolymer of ethylene, acrylic ester and glycidyl methacrylate which is commercially available from Arkema (Bristol, PA, USA) under the trade name Lotader® AX8900. Another example of the aforementioned reactive impact modifier is commercially available from Dow Inc. (Midland, MI, USA) under the trade name Paraloid™ EXL 2314, which is a core-shell type acrylate based impact modifier comprised of a core primarily comprised of cross-linked poly(n-butyl acrylate) rubber and having a shell phase comprised primarily of a poly(methyl methacrylate)-poly (glycidyl methacrylate) copolymer. In some embodiments, the reactive impact modifier can have an acrylic ester concentration from about 10 mol % to about 40 mol % and/or a glycidyl methacrylate concentration of from about 4 mol % to about 20 mol %.

The polymer matrix comprises from 0.5 wt. % to 25.0 wt. % of the at least one impact modifier with respect to the total weight of the polymer matrix. The impact modifier can be at least 1.0 wt. %, at least 2.0 wt. % or at least 3.0 wt. %, even at least 5.0 wt. % of the total weight of the polymer matrix. The impact modifier typically is not more than 20.0 wt %, not more than 15.0 wt. %, not more than 12.0 wt. %, even not more than 10.0 wt. %. Suitable ranges may be for instance from 0.5 to 15.0 wt. %, even from 0.5 to 12.0 wt. %, or even 2.0 to 10.0 wt. %.

Additives

In some embodiments, in addition to the at least one thermoplastic polymer, the polymer matrix can further include optional additives, including but not limited to, antioxidants (e.g. ultraviolet light stabilizers and heat stabilizers), processing aids, nucleating agents, lubricants, flame retardants, smoke-suppressing agents, anti-static agents, anti-blocking agents, colorants, pigments, and conductivity additives such as carbon black.

In some embodiments, antioxidants can be particularly desirable additives. Antioxidants can improve the heat and light stability of the polymer matrix in the composite. For example, antioxidants that are heat stabilizers can improve the thermal stability of the composite during manufacturing (or in high heat application settings), for example, by making the polymer processable at higher temperatures while helping to prevent polymer degradation.

Additionally, the antioxidants that are light stabilizers can further prevent against polymer degradation during use of the composite application settings where it is exposed to light (e.g. external automobile or aircraft parts). Desirable antioxidants include, but are not limited to, copper salts (e.g. CuO and $Cu_2O$), alkaline metal halides (e.g. CuI, KI, and KBr, including combinations of alkaline metal halides such as, but not limited to, CuI/KI), hindered phenols, hindered amine light stabilizers ("HALS") (e.g. tertiary amine light stabilizers) and organic or inorganic phosphorous-containing stabilizers (e.g. sodium hypophosphite or manganese hypophosphite).

In some embodiments, the additive is a halogen-free flame retardant. In some embodiments, the halogen free flame retardant is an organophosphorous compound selected from the group consisting of phosphinic salts (phosphinates), diphosphinic salts (diphosphinates) and condensation products thereof.

When present, the total concentration of additives in the polymer matrix is at least 0.1 w. %, at least 0.2 wt. %, at least 0.5 wt. %, or at least 1.0 wt. %, even at least 2.0 wt. %, relative to the total weight of the polymer matrix. Additionally or alternatively, the total concentration of additives in the polymer matrix is no more than 30 wt. %, no more than 20 wt. %, no more than 10 wt. %, relative to the total weight of the polymer matrix.

In an embodiment of the invention, the polymer matrix comprises at least one thermoplastic polymer selected from the group consisting of semi-aromatic polyamides, and at least one impact modifier selected from the group consisting of ethylene-higher alpha-olefin polymers and ethylene-higher alpha-olefin-diene polymers grafted or copolymerized with reactive carboxylic acids or their derivatives such as, for example, acrylic acid, methacrylic acid, maleic anhydride or their esters; ethylene-methyl acrylate-glycidyl methacrylate terpolymers, copolymers based on styrene and ethylene and/or butylene optionally grafted with maleic anhydride.

In an aspect of said embodiment the semi-aromatic polyamide is selected from the group consisting of PA 4T, PA 5T, PA 6T, PA 6I, PA 9T, PA 10T, PA 6T/6I, PA 6T/66 and PA 6T/6I/66.

It has been found that when the reinforcing fiber is selected from the group of glass fibers or carbon fibers an advantageous polymer matrix comprises at least semi-aromatic polyamides selected from the group consisting of PA 6T, PA 6I, PA 9T, PA 10T, PA 6T/6I, PA 6T/66 and PA 6T/6I/66, and 0.5 to 15.0 wt. % of at least one impact modifier selected from the group consisting of ethylene-higher alpha-olefin polymers and ethylene-higher alpha-olefin-diene polymers grafted or copolymerized with reactive carboxylic acids or their derivatives such as, for example, acrylic acid, methacrylic acid, maleic anhydride or their esters; ethylene-methyl acrylate-glycidyl methacrylate terpolymers, copolymers based on styrene and ethylene and/or butylene optionally grafted with maleic anhydride.

In another embodiment, the polymer matrix comprises at least one polyphenylene sulfide polymer and 0.5 to 15.0 wt. % of at least one impact modifier.

The Composite Material Fabrication

The composites can be fabricated by methods well known in the art. In general, regardless of the type of method, composite fabrication includes impregnation of the reinforcing fibers with the polymer matrix material, and subsequent cooling or drying to form a layer (L) followed by a step wherein at least two layers (L) are laid one over the other and optionally consolidated to form a composite structure comprising at least two layers.

Impregnation of the reinforcing fibers with the polymer matrix may take place for instance by means of a melt impregnation process, which includes contacting the reinforcing fibers with a melt of the polymer matrix material. To make the polymer matrix material processable, the melt is at a temperature of at least Tm* to less than Td*, where Tm* is the melt temperature of the thermoplastic polymer in the polymer matrix having the highest melt temperature and Td* is the onset decomposition temperature of the thermoplastic polymer having the lowest onset decomposition temperature in the melt. In some embodiments, melt impregnation can further include mechanical compression of the melt against the fibers. For example, in thermo-pressing, the polymer matrix material is heated to form a melt and mechanically compressed against the fibers simultaneously. In other melt impregnation embodiments incorporating mechanical compression, the fibers can first be contacted with the melt and subsequently mechanically compressed. Subsequent to melt impregnation, the impregnated reinforcing fibers are cooled to form a solid composite.

One example of a composite fabrication method includes pultrusion. In pultrusion, a plurality of fibers are aligned along their length and pulled in a direction along their length. In some embodiments, the plurality of fibers is delivered from a spool(s) of the reinforcing fiber. To impregnate the fibers, the fibers are pulled through a bath including a melt of the polymer matrix. After being pulled through the melt, in some embodiments, the impregnated fibers can be further heated to further aid in the impregnation. Additionally or alternatively, the impregnated fibers can be pulled through a die and to provide the desired shape to the composite, prior to cooling to room temperature. Pultrusion can be particularly desirable in the formation of unidirectional composites.

Another example of a composite fabrication method includes a solution process. In such a process, a solution is formed by dissolving the polymer matrix in a liquid medium. The solution is coated onto a surface of the fibers, for example, by passing the fibers through a bath of the solution. Subsequently, the coated fibers are then heated and consolidated.

Composite laminates may be manufactured by depositing, or "laying up" layers (L), at least two layers (L), on a mold, mandrel, tool or other surface. This process is repeated several times to build up the layers of the final composite laminate.

The plies may be stacked, manually or automatically, e.g., by automated tape layup (ATL) or by using "pick and place" robotics, or automated fiber placement (AFP) wherein pre-impregnated tows of fibers are heated and compacted in a mold or on a mandrel, to form a composite laminate having desired physical dimensions and fiber orientations. AFP and ATL are techniques generally employ a tape supply reel; a tape driving and cutting device; and a compaction roller or shoe that impresses the tape on to the surface of the part in process. The fiber reinforced tape is typically heated at the tape head and compaction pressure is applied by means of compaction roller to insure proper adhesion of the tape to the working surface or to previously applied layers of tapes. The AFP or ATL machine can lay the tape in a computer-controlled path, controlling the location and angle of the cuts, allowing any number and variety of final two-dimensional structures and orientations.

The layers of an unconsolidated laminate are typically not completely fused together and the unconsolidated composite laminate may exhibit a significant void content, e.g., greater than 20% by volume. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content. Accordingly, in some embodiments, the present invention is directed to methods for consolidating the composite materials disclosed herein. This method includes stacking or otherwise arranging a plurality of plies, such that at least one surface of each ply is in contact with at least one surface of at least one other ply, and fusing the plies together to form an article having less than 5% by volume, more typically less than 2% by volume, void content.

In one embodiment, the composite material is consolidated in a vacuum bag process in an autoclave or oven. In one embodiment, the composite material is consolidated in vacuum bag process under a vacuum of greater than 600 mm Hg by heating to a consolidation temperature of greater than 320 °C, more typically from 330 °C to 360 °C, and once consolidation temperature is reached, pressure, typically from 0 to 20 bars, is applied for a time, typically from 1 minute to 240 minutes and then allowed to cool. Overall cycle time, including heating, compression, and cooling, is typically within 8 hours or less, depending on the size of the part and the performance of the autoclave.

In one embodiment, the composite material is laminated by an automated lay-up machine (ATL, AFP or filament wind) outfitted with a heat device to simultaneously melt and fuse the layer to the previous laid layer as it is being placed and oriented on the previous laid layer to form a low void, consolidated laminate (<2% volume of voids). This low void consolidated laminate can be used "as is" or subsequently annealed in either a free standing or vacuum bag operation typically in temperature range of 170 °C to 270 °C for a time from 1 minute to 240 minutes.

In one embodiment, the fully impregnated composite prepreg material plies are laminated by an automated lay-up machine outfitted with a heat device to simultaneously melt and fuse the layer to the previous layer as it is being placed and oriented on the previous laid layer to form a preform with a void content >2%. The preform is then subsequently consolidated in either a "vacuum bag process" as described earlier, compression mold, stamp form, or continuous compression molding process.

In one embodiment, the fully impregnated composite prepreg material plies are pre-oriented and consolidated in a heated and cooled press, double belt press or continuous compression molding machine to make a consolidated laminate that can be cut to size to be a forming blank in a stamp forming process where the forming blank is heated rapidly to the melt processing temperature before shaping and consolidating the molten blank in the tool. The resulting part can be used "as is" or in a subsequent step of placing said formed part in an injection molding tool to rapidly heat the laminate to an intermediate temperature to inject a higher melt processing temperature polymer to make a complex shaped hybrid part.

Articles

The thermoplastic composites described herein can be desirably incorporated into articles for use in a wide variety of application settings such as an automotive component, aerospace components, oil and gas drilling components, for Smart Devices, medical mousings or medical mevices, urban air mobility devices, electronic devices.

With respect to automotive applications, the inventive composites can be integrated into automotive components including, but not limited to, pans (e.g. oil pans), panels (e.g. exterior body panels, including but not limited to quarter panels, trunk, hood; and interior body panels, including but not limited to, door panels and dash panels), side-panels, mirrors, bumpers, bars (e.g., torsion bars and sway bars), rods, suspensions components (e.g., suspension rods, leaf springs, suspension arms), turbo charger components (e.g. housings, volutes, compressor wheels and impellers) and housings for battery components. The thermoplastic composites described herein can also be desirably integrated into aerospace components, oil and gas drilling components (e.g. downhole drilling tubes, chemical injection tubes, undersea umbilicals and hydraulic control lines) and mobile electronic device components.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention.

EXAMPLES

Raw Materials

Semi-aromatic Polyamide 1 (PPA1): Amodel® A1006 (PAGT/6I/66) obtained from Solvay Specialty Polymers USA, L.L.C.

Semi-aromatic Polyamide 2 (PPA2): Genestar GC 98018 (PA9T) obtained from Kuraray, Co. Ltd.

PPS polymer (PPS): Ryton® QA200P obtained from Solvay Specialty Polymers USA, L.L.C.

Impact modifier 1 (IM1): Kraton® FG 1901 GT a linear triblock copolymer based on styrene and ethylene/butylene with a polystyrene content of 30% supplied by Kraton Polymers US, LLC.

Impact modifier 2 (IM2): Lotader@ AX8900 a random terpolymer of ethylene, acrylic ester and glycidyl methacrylate supplied by Arkema Reinforcment fiber 1 (GF): TufRov® 4510 fiberglass roving supplied by Nippon Electric Glass.

Reinfrocement fiber 2 (CF): HexTow® AS4D carbon fiber supplied by Hexcel®

Heat Stabilizer (HS): HS Pellet Blend supplied by Ajay North America, LLC.

Manufacture of Composite Materials

Continuous filament carbon fiber unidirectional tape prepregs (Layer (L)) were formulated using polymer matrices, as described in Table 1. The amount by weight of the thermoplastic polymer and of the impact modifier are calculated based on the total weight of the polymer matrix. The amount of the reinforcing fibers in the prepreg is measured in ters of volume fraction with respect to the total volume of the prepreg.

Such unidirectional prepregs were made using a melt impregnation process as fundamentally described in EP 102158 (using different equipment). sufficient number of fibers were used to make a 76 mm wide unidirectional tape. The resulting tape prepregs had a nominal polymer matrix content of 38 wt. % and a fiber areal weight of 180 g/m$^2$.

The prepreg tape was cut and manually laid up with the plies being lightly tacked together with a soldering iron into various lay-ups in preparation for autoclave consolidation. The lay-up consisted of 12 plies ($[(0/90)_3]_5$ configuration). Sacrificial polyimide surface films were applied before the ply stack was loaded into steel picture frame style tooling. The tooling was loaded into a compression press at the desired consolidation temperature. 500 psi of pressure was applied and the laminate was held for two minutes. The temperature was cooled to room temperature at 8 °C/minute with pressure still applied before the tooling was removed, and the laminate demoulded.

The test panels were removed from the autoclave and then ultrasonic scanned to ensure good consolidation (less than 2% void content) before machining the laminates into test coupons for the mechanical test to be performed.

Samples of unidirectional tape were cut perpendicular to the fibre direction before being stabilised and set with a two component epoxy resin (an example of a suitable casting resin is Epoxicure 2™ from Buehler). After curing, the puck was progressively abraded and polished using first sandpaper, and then a diamond slurry on a felt pad. Sandpaper grits of 280/P320 to 1200/P4000 are appropriate for the initial abrasion, and then diamond slurries with a particle size of 3.0 μm, then 1.0 μm, and finally 0.1 μm were used for polishing; a suitable slurry would be from the Glennel® Diamond Suspension range from Electron Microscopy Sciences.

Imaging: The polished samples were imaged using an optical microscope under different magnification levels (100-300×). The full tape cross-section image (30 mm wide) was inspected for the evidence of transverse cracks. Two samples per laminate were inspected. If present, these appear as dark jagged cracks running through fibre beds.

TABLE 1

| | Example No | | | | | | | |
|---|---|---|---|---|---|---|---|---|
| | CE1 | E1 | CE2 | E2 | CE3 | E3 | CE4 | E4 |
| PPA1 (wt. %) | 100 | 90 | | | | | | |
| PPA2 (wt. %) | | | 99 | 89 | 99 | 89 | | |
| PPS (wt. %) | | | | | | | 100 | 90 |
| IM1 (wt. %) | | 10 | | 10 | | | | |
| IM2 (wt. %) | | | | | | 10 | | 10 |
| HS | | | 1 | 1 | 1 | 1 | | |
| Fibre (vol %) | 50 GF | 50 GF | 50 GF | 50 GF | 50 CF | 50 CF | 50 CF | 50 CF |
| Cracking | Y | N | Y | N | Y | N | Y | N |

The results in Table 1 show that composite laminates of the invention (Examples 1 to 4) exhibit an increased resistance to cracking with respect to the laminates of Comparative Examples 1 to 4.

The invention claimed is:

1. A composite material comprising at least two layers (L), each layer (L) comprising continuous reinforcing fibers and a polymer matrix, wherein the polymer matrix comprises:

at least one thermoplastic polymer selected from the group consisting of aliphatic polyamides, semi-aromatic polyamides, polyaryleneetherketones, polyphenylenesulfides, liquid crystalline polymers, and mixtures thereof, and at least one impact modifier, wherein the continuous reinforcing fibers have a length, in the longest dimension, of at least 5 mm, and wherein the impact modifier is selected from the group consisting of ethylene-butene copolymers; ethylene-octene copolymers; polypropylenes and copolymers thereof; polybutenes; polyisoprenes; ethylene-propylene-rubbers (EPR), ethylene-propylene-diene monomer rubbers (EPDM), ethylene-acrylate rubbers; butadiene-acrylonitrile rubbers, ethylene-acrylic acid (EAA), ethylene-vinylacetate (EVA), acrylonitrile-butadiene-styrene rubbers (ABS), block copolymers styrene ethylene butadiene styrene (SEBS); block copolymers styrene butadiene styrene (SBS), core shell elastomers of methacrylate-butadiene-styrene (MBS), terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride, ABS copolymers grafted with maleic anhydride, and mixtures thereof, and wherein at least two layers (L) are laid one over the other, and optionally consolidated, to form a composite structure comprising at least two layers.

2. The composite of claim 1, wherein the at least one thermoplastic polymer is selected from the group consisting of semi-aromatic polyamides, polyaryleneetherketones, polyphenylenesulfides, liquid crystal polymers, and mixtures thereof.

3. The composite of claim 1, wherein the at least one thermoplastic polymer is selected from the group consisting of semi-aromatic polyamides and polyaryleneetherketones, and mixtures thereof.

4. The composite of claim 1, wherein the at least one thermoplastic polymer is selected from the group consisting of semi-aromatic polyamide polymers.

5. The composite of claim 1, wherein the continuous reinforcing fibers are selected from the group consisting of glass fibers, carbon fibers, aramid fibers, ceramic fibers, and mixtures thereof.

6. The composite of claim 4, wherein the semi-aromatic polyamide polymers are selected from the group consisting of PA 4T, PAST, PA 6T, PA 6I, PA 9T, PA 10T, PA6T/6I, PA 6T/66, PA 6T/6I/66, MXD6, copolymers thereof, and mixtures thereof.

7. The composite of claim 1, wherein the volume of the continuous reinforcing fibers is from 20% to 80% with respect to the total volume of layer (L).

8. The composite of claim 1, wherein the impact modifier is selected from the group consisting of polypropylenes and copolymers thereof, acrylonitrile-butadiene-styrene rubbers (ABS); block copolymers styrene butadiene styrene (SBS), core shell elastomers of methacrylate-butadiene-styrene (MBS), and mixtures thereof.

9. The composite of claim 1, wherein the polymer matrix comprises from 0.5 wt. % to 25.0 wt. % of the at least one impact modifier, with respect to the total weight of the polymer matrix.

10. The composite of claim 1, wherein the reinforcing fiber is selected from the group consisting of glass fibers and carbon fibers and the polymer matrix comprises at least one semi-aromatic polyamide selected from the group consisting of PA 6T, PA 6I, PA 9T, PA 10T, PA 6T/6I, PA 6T/66 and PA 6T/6I/66, and 0.5 to 15.0 wt. % of the at least one impact modifier.

11. The composite of claim 1, wherein the composite is a unidirectional composite.

12. The composite of claim 1, wherein the composite is a multiaxial composite laminate.

13. The composite of claim 1, wherein the continuous reinforcing fibers are in a configuration selected from the group consisting of a woven fabric, a layered fabric, or a combination thereof.

14. An article comprising the composite of claim 1.

15. The article of claim 14, wherein the article is selected from the group consisting of an automotive component, a battery housing, an aerospace component, oil and gas drilling components, a component for Smart Devices, a medical housing or component for medical devices, an Urban Air Mobility device, and an Electronic Device.

16. The composite of claim 1, wherein the at least two layers (L) are laid one over the other such that at least one surface of each layer (L) is in contact with at least one surface of at least one other layer (L).

17. The composite of claim 1, wherein the composite material is consolidated and has a void content of less than 5% by volume.

18. The composite of claim 1, wherein the composite consists of the layers (L).

* * * * *